United States Patent
Bates

[15] 3,672,333
[45] June 27, 1972

[54] METHOD OF FEEDING AND WATERING ANIMALS

[72] Inventor: Marcus L. Bates, 6904 N. Russell Avenue, Odessa, Tex. 79760

[22] Filed: March 5, 1971

[21] Appl. No.: 121,474

Related U.S. Application Data

[63] Continuation of Ser. No. 831,600, June 9, 1969, Pat. No. 3,581,711.

[52] U.S. Cl. ............................................................. 119/51.5
[51] Int. Cl. ............................................................ A01k 05/00
[58] Field of Search ...................... 119/51.5, 56, 51.13, 51.14

[56] References Cited

UNITED STATES PATENTS

| | | | |
|---|---|---|---|
| 1,029,623 | 6/1912 | Nieman et al. | 119/56 R |
| 1,207,938 | 12/1916 | Kuxman | 119/51.5 |
| 1,219,114 | 3/1917 | Lappas | 119/51.5 |

Primary Examiner—Hugh R. Chamblee
Attorney—Marcus L. Bates

[57] ABSTRACT

Method of automatically feeding and watering animals by the provision of apparatus having a main housing within which there is disposed a plurality of pivotally mounted upwardly opening spaced apart enclosures, with each enclosure including a food containing chamber and a water containing chamber therein. Overlying the chambers there is disposed a water conveying means comprised of individual sloped troughs, each arranged in series relationship with respect to one another, so as to intercept and convey water from a first enclosure to a last enclosure, whereupon the water fills the water chamber thereof causing the center of gravity to change. This action-forces the last enclosure to rotatably invert, thereby depositing the water and food contained therein into a food receptacle or feeding trough. Each of the enclosure means is sequentially inverted in a similar manner, thereby making food and water available to animals at predetermined intervals of time.

4 Claims, 7 Drawing Figures

PATENTED JUN 27 1972 3,672,333
INVENTOR
Marcus L Bates
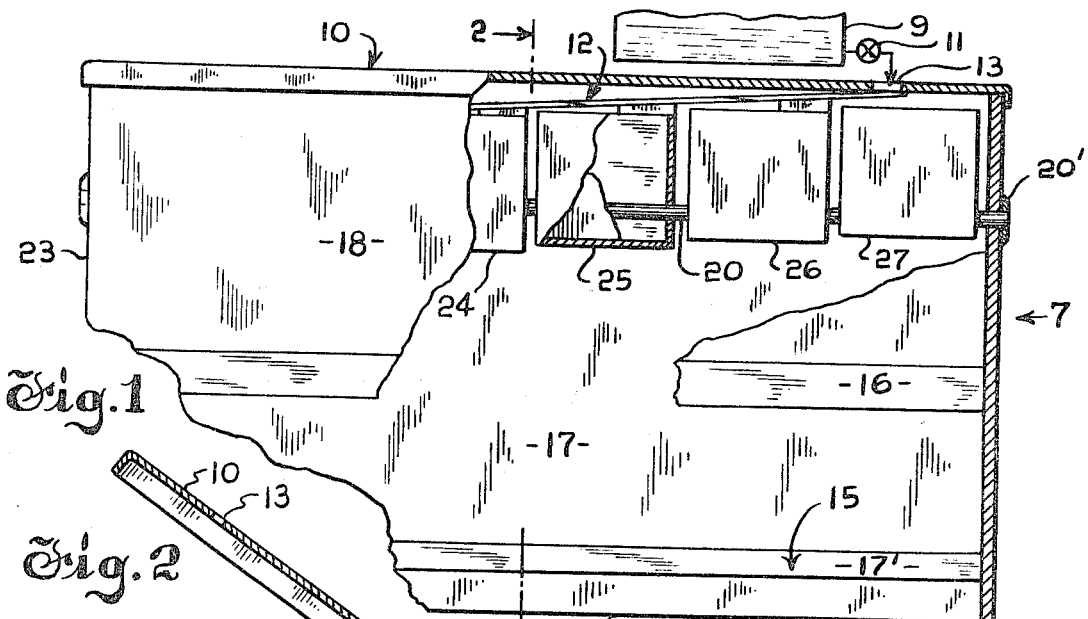
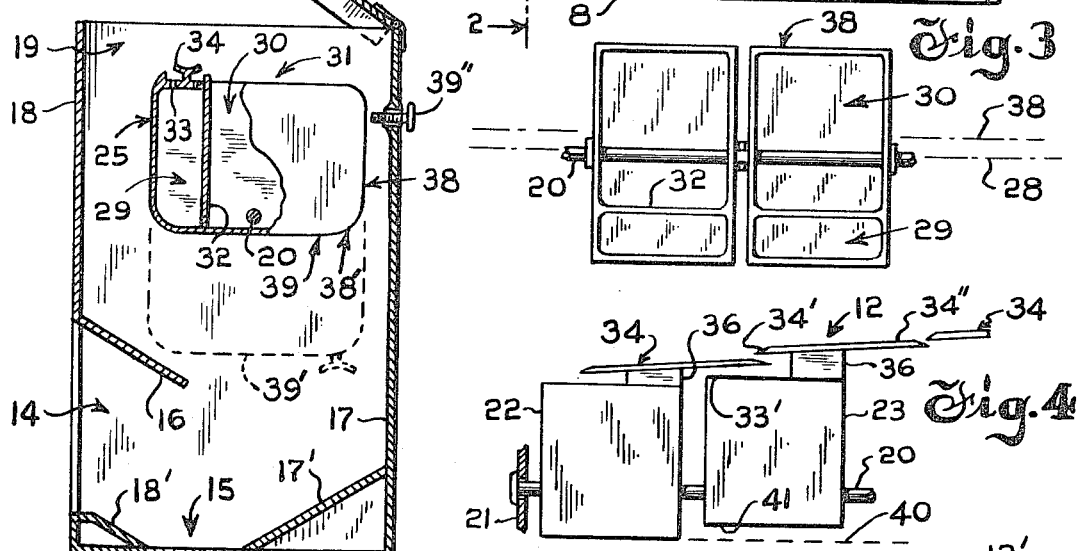
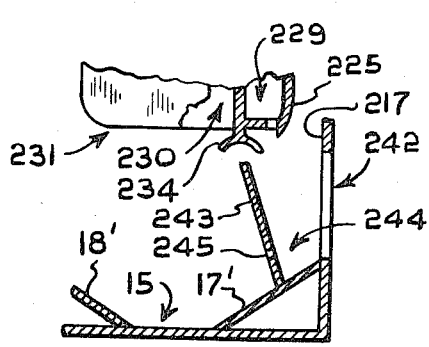

METHOD OF FEEDING AND WATERING ANIMALS

REFERENCE TO RELATED PATENT APPLICATION

Ser. No. 831,600, filed June 9, 1969, now U.S. Pat. No. 3,581,711, issued June 1, 1971, of which this application is a continuation.

BACKGROUND OF THE INVENTION

Ownership of animals, especially domesticated animals such as dogs and cats, imposes a duty upon the owner to see that the pets are cared for and fed at least one time a day. Young animals must be fed several times a day. Pets are often neglected because their owners forget to feed them. There are times when pets become an extreme inconvenience and liability for the reason that they must be boarded or otherwise imposed upon a third party when their masters are absent from home a length of time which exceeds a day. It is therefore desirable for one to be able to automatically feed pets for several consecutive days in a reliable and punctual manner.

SUMMARY OF THE INVENTION

Generally, the present method comprehends the feeding of animals at predetermined intervals of time by utilizing the flow of a liquid in a manner to sequentially shift the center of gravity of a plurality of food containers in a direction to cause the containers to assume a position which makes available to the animals, the food which was previously located within the chambers.

More specifically, this invention provides for improvements in a method for the automatic feeding and watering of animals. In order to illustrate the method, there is set forth herein an embodiment which enables apparatus having a main housing within which there is disposed a multiplicity of pivotally mounted enclosures. Each enclosure has a food containing chamber and a water containing chamber formed therein. The water chamber is mounted off-center with respect to the pivot means. A sloped trough associated with each enclosure means, save the first, cooperates with one another in a manner which provides a water conveying means to the last enclosure of the series. Each enclosure means is pivoted from an upright to an inverted position when the center of gravity thereof is shifted because of an accumulation of water within the water chamber thereof. Accordingly, a metered supply of water is received by the water conveying means, thereby filling the water chamber thereof, whereupon the enclosure means inverts and the food and water contained therein is deposited into a feeding trough or a feeding and a watering trough located within the main housing. This action causes the water conveying trough of the next adjacent upright enclosure means to communicate with and commence filling the water chamber of the last upright enclosure means with water, and upon the water chamber becoming at least partially filled, this enclosure is also caused to invert so as to enable the water chamber of the next adjacent enclosure means to commence to be filled. This action continues in a sequential manner until the center of gravity of each of the enclosure means has been shifted or moved an amount to cause the enclosure to be inverted, thus depositing the food and water therefrom and into the feeding trough at predetermined, spaced apart, timed intervals.

It is therefore a primary object of the present invention to provide a method by which an animal feeding apparatus is actuated by a controlled flow of water.

Another object of the present invention is the provision of a method for watering and feeding animals by the provision of apparatus which is actuated upon a water chamber associated therewith becoming at least partially filled with water.

Still another object of the present invention is the provision of a method of feeding animals wherein an enclosure means is inverted when its center of gravity is shifted a predetermined amount due to water being collected therein.

A still further object of the present invention is a method of automatically feeding and watering animals which includes a plurality of spaced apart enclosure means having a food containing chamber, a water containing chamber, and which can be pivotally inverted due to the center of gravity thereof being progressively shifted to a predetermined location.

The above objects are attained in accordance with the present invention by the provision of apparatus fabricated in accordance with the foregoing abstract and summary. Other objects of the present invention will become apparent to those skilled in the art as the remainder of the present disclosure is more fully digested.

BRIEF DESCRIPTION OF THE DRAWINGS

FIG. 1 is a partial front elevational view with some parts thereof being broken away and removed in order to show the interior thereof, and with some of the remaining parts being shown in section;

FIG. 2 is a cross-sectional view taken along line 2—2 of FIG. 1, with some additional parts being illustrated therein;

FIG. 3 is a fragmentary top view of part of the apparatus as seen in FIGS. 1 and 2;

FIG. 4 is a fragmentary front view of a portion of the apparatus seen in FIGS. 1–3;

FIG. 5 sets forth one modification of FIG. 4;

FIG. 6 is a fragmentary, part cross-sectional view, which sets forth another modification of the embodiment disclosed in FIGS. 1–4; and FIG. 7 is a fragmentary representation of still another modification of part of the apparatus seen in the previous figures.

DETAILED DESCRIPTION OF THE PREFERRED EMBODIMENTS

FIG. 1 discloses an automatic feeding and watering apparatus for feeding animals, and includes a main housing 7 which is bottom supported by a base 8 with a water supply 9 being disposed above closure member 10. Valve 11 meters a predetermined quantity of water into water conveying means 12 with the water preferably freely flowing through flow passageway 13.

As best illustrated in FIG. 2, in conjunction with FIG. 1, a feeding entrance 14 is longitudinally disposed across the lower front portion of the main housing and communicates with feeding trough 15 so as to allow access thereinto. Inwardly and downwardly sloped member 16 overlies the entrance and prevents access to the upper interior of the main housing.

Rear wall 17 has sloped member 17' attached thereto and forms a portion of the feeding trough. Front wall 18, which may be a continuation of member 16, cooperates with the remaining structure to form an opening 19 into the upper portion of the apparatus.

Suitably attached to each of the end walls of the main housing is a shaft 20 which rotatably supports a plurality of spaced apart upwardly opening enclosure members 22, 23, 24, 25, 26, and 27. It should be understood that although there are six illustrated enclosure members, that there could be as few or as many enclosures members as considered practical while still remaining within the teachings of the present invention. Each enclosure member includes a water containing chamber 29 and a food containing chamber 30 having opening 31, with the two chambers being separated from one another by the illustrated vertical bulkhead 32. The water containing chamber has a perforated or apertured member 33 disposed thereabove and forms the lowermost portion of a water collecting depression, with the member 33 additionally supporting a sloped water trough 34. The water trough of each enclosure forms a portion of the before mentioned water conveying means.

As particularly seen in FIG. 4, the sloped trough is formed with a lowermost end portion 34' and an uppermost end portion 34", with the trough being attached to the water chamber by web 36. The uppermost marginal depending end portion of one sloped trough underlies the lowermost marginal depending end portion of the next adjacent sloped trough, except for the last enclosure member 22 which, of course, forms the end of the water conveying means, and except for the first enclosure member 27 which is aligned with the flow passageway 13 located directly above the water chamber thereof. As seen in FIG. 5, web members 36 may be of various adjusted height so as to enable proper relative elevation of the plurality of sloped troughs. Furthermore, as seen in FIG. 4, the bottom 40, 41 of adjacent enclosure members may be offset by locating shaft 20 at different elevations therethrough if deemed desirable. Either or both expedient may be used to advantage in order to attain the proper cooperative relationship between the various troughs.

Looking now to the details of FIG. 6, wherein similar numerals relate to similar elements, the enclosure member is seen to be in the inverted position. The sloped water trough 234 is seen to be an extension of the bulkhead which separates the water chamber from the food chamber. Underlying the sloped water trough is a longitudinally extending wall member 243 having aperture 245 formed therein with the wall members 217, 17', and 243 forming a drinking trough at 244. Rearwardly directed drinking entrance 242 enables access to the water contained within the drinking trough.

As seen in FIG. 7, the sloped water conveying troughs may be in the form of tubular members having a lowermost end portion 137' which overlies the enlarged uppermost water inlet portion 130 with the adjacent ends being arranged in overlying relationship as best seen at 137.

OPERATION

In operation, the closure member 10 is pivoted away from opening 19 so as to enable each of the spaced apart enclosure members to be returned to their normal upright position in a manner as disclosed in FIGS. 1 and 2. The dog food, for example, is deposited into the food chamber 30 through inlet 31, with rear wall 38 of each food chamber resting against screw adjustment 39". With each food chamber in upright position, the sloped troughs form a continuous water conveying means such as seen at 12 in FIG. 1, with the depending end portions of each individual trough overlapping the depending end portions of adjacent troughs, all in the manner of FIGS. 1, 4, 5, and 7. The water supply 9, if desired, can form a portion of the closure means 10. With valve 11 opened a predetermined amount, water drips or otherwise flows through aperture 13 where it is intercepted by the first water trough and prevented from entering the water chamber of enclosure 27 because of the presence of the sloped trough associated with enclosure member 26. Accordingly, water is transferred from 11 along the water conveying means where it is flow conducted into the water chamber of the last enclosure means 22. As the water chamber of enclosure 22 becomes at least partially filled with water, the center of gravity of the enclosure is shifted towards the front of the main housing, whereupon the enclosure means rotates or pivots about rod 20 and into the inverted position indicated in phantom by the numeral 39'. This action enables the food which falls by gravity from chamber 30 along with the water which flows by gravity from chamber 29 to be deposited into the feeding trough where the dry food absorbs the water, rendering the food more appetizing to the animal.

As the enclosure means is pivoting into the inverted position, the sloped trough 34 is being carried therewith, thereby positioning or leaving the next adjacent sloped trough in overlying relationship with respect to its associate water chamber, whereupon the water supply is now metered thereinto. Accordingly, each enclosure member sequentially fills with water and inverts, thereby leaving the next adjacent upright chamber in proper position to begin filling with water so as to ultimately shift its center of gravity so as to cause it to eventually attain the inverted position along with all the other inverted enclosure members. As the next to the last enclosure member moves to the inverted position, water which is dripping through flow passageway 13 is directly conveyed into its water chamber, causing it also to eventually attain an inverted position. Hence, each enclosure member is sequentially inverted, forcing water and food to be transferred into the feeding trough in response to the water flow rate.

As seen in FIGS. 4 and 5, the bottom-most portion of adjacent enclosure means, illustrated at 40, 41, can be off-set by arranging the location of shaft 20 with respect thereto. Alternatively, the proper slope of the water conveying means can be attained by changing the width of one member 36' with respect to another as indicated at 35'. As another alternative, especially where a large number of enclosure members are required, advantage can be taken of both these expedients as seen illustrated in FIG. 4.

As seen in FIG. 6, the water and food may be maintained separate from one another by the provision of bulkhead 243. As each enclosure member is inverted, the trough 234 cooperates with bulkhead 243 to cause water to flow from water chamber 229 and into drinking trough 244 while the food is deposited into the feeding trough. Aperture 245 permits water from the drinking trough to overflow into the feeding trough should excess water be accumulated in the drinking trough, otherwise bulkhead 243 separates the food and water troughs from each other.

In arid regions of low humidity, it is advantageous to decrease the water evaporation loss by the provision of tubular sloped members as seen in FIG. 7. Water flow in this embodiment occurs through the tubular members by following a flow path defined by entrance 130, through the tubular member 134, where the water then falls from the lowermost end of one sloped tubular member into the entrance formed at the uppermost end of another sloped member.

It is economically advantageous to mold a single enclosure member having a vertical reinforcement along each side wall to enable shaft 20 to be received by an aperture which is formed at various elevations along the reinforcement. This expedient enables a single type enclosure member to be slightly modified at 22–27. The water troughs likewise may be fabricated from a single mold, and the web 36 cut to a length which will provide the desired height thereof, with the web being affixed to either the common wall 32 or to the perforated member 33 by any desired means including heat welding and cementing. The enclosure members may alternatively be individually journaled to a rear wall extension, if desired.

The shaft 20 can be located along dot-dash line 28 or 38, depending upon the amount of water deemed desirable to shift the center of gravity an amount to unbalance and pivot the enclosure member. The rod must be received by the enclosure member at an elevation, generally located well below the geometrical center, which will cause the member to invert prior to the water chamber becoming completely filled. These and various other configurations of enclosure members may require different shaft mounting locations, the optimum being readily determined by either calculation or by trial and error.

It will now be obvious to those skilled in the art that the outer peripheral surface of each enclosure member must be positioned with respect to wall members 16, 17, and 18 whereby ample clearance is provided to allow rotation of the enclosure members. It is also desirable that the animals be restricted from contacting the upright enclosures.

It should be understood that the number of enclosure members can be varied in accordance with the feeding habits of the animal which will use the apparatus. With the average dog, for example, a feeding unit having five enclosure members enables the animal to be safely left alone for more than 72 hours, assuming a feeding cycle based on twelve hour intervals.

Where deemed desirable, means for causing various audible signals or sounds can be incorporated into the apparatus whereby actuation of each of the individual enclosure members from an upright into an inverted position is accompanied by an audible signal which informs the pet that the next meal has been served by the apparatus.

I claim:

1. Method of feeding animals at predetermined intervals of time according to the following steps:

1. forming a liquid containing chamber and a food containing chamber within an enclosure member;
2. pivotally supporting at least one said enclosure member, wherein the member can be pivotally rotated from an upright to an inverted position;
3. locating the pivot point and the liquid containing chamber and the food containing chamber relative to one another whereby the enclosure member remains in the upright position when the food container is partially filled with food and the liquid chamber is essentially empty;
4. forming a metered liquid flow path extending from a source and to the liquid containing chamber; whereby, the accumulation of liquid in the liquid containing chamber causes the center of gravity of the enclosure member to change sufficiently to cause rotation of the enclosure member into an inverted position.
2. The method of claim 1, and further including the steps of:
5. pivotally mounting another enclosure member as set forth in step (1) and (3) adjacent to the first recited enclosure member;
6. intercepting the metered liquid flow path of step (4) and conveying the liquid into the liquid chamber of the enclosure member of step (5).
3. The method of claim 1, and further including the steps of:
5. arranging a plurality of enclosure members in side by side relationship;
6. extending a portion of each of the enclosure members into overlying relationship with respect to a next adjacent flow path so as to intercept the liquid flow and transport the liquid to the last upright enclosure member.
4. The method of claim 1, and further including the steps of:
5. carrying out step (2) by pivotally supporting a plurality of enclosure members in side by side relationship so that one member is adjacent to another member;
6. carrying out step (4) by forming a flow conduit which is placed in overlying relationship with respect to the liquid containing chamber and attached to rotate with the enclosure member;
7. spacing each member apart and arranging the flow conduit of the last member together with a flow conduit of the remaining upright members whereby they are series connected.

* * * * *